UNITED STATES PATENT OFFICE.

CHARLES McBURNEY, OF BOSTON, MASSACHUSETTS.

IMPROVEMENT IN FINISHING VULCANIZED-RUBBER BELTINGS.

Specification forming part of Letters Patent No. 115,880, dated June 13, 1871; reissue No. 4,662, dated December 5, 1871.

*To all whom it may concern:*

Be it known that I, CHARLES McBURNEY, of Boston, in the county of Suffolk and State of Massachusetts, have invented an Improvement in the Process of Finishing Vulcanized-Rubber Belting, of which the following is a full and accurate description:

Rubber belting is made of several alternate thicknesses of heavy cotton duck and of well-known vulcanizable rubber compounds. In the ordinary process of manufacture the duck is first coated on both sides with such compound by means of heavy steam-heated rolls, the duck being unavoidably stretched to its utmost capacity during this operation. The sheet of duck thus coated is cut into strips of the desired widths, and these are folded together into belts, which are firmly united (owing to the adhesive nature of the rubber) by pressing between rolls to prepare them for vulcanization, which is effected in a large iron cylinder, the belts being run into and out of the same upon a suitable carriage constructed for the purpose. The carriage preferred has, besides the bottom, which serves as a shelf, one or more additional shelves, on which to lay the belts folded in lengths one above another. Thus laden, the carriage is run into the cylinder, the end of which is afterward closed. Steam is then introduced through pipes having valves by which to regulate the degree and duration of heat, which is usually from 240° to 255° Fahrenheit, continued for several hours. This process is always attended with such contraction of the duck that the belt when put to use stretches and requires to be shortened, sometimes repeatedly.

The purpose of my invention is, while finishing belting more perfectly and uniformly vulcanized than can be done in any other manner known to me, to obviate the difficulty referred to and utilize from four to five per cent. in the length of belting heretofore wasted after being stretched for use. I do this by successively heating, stretching, and cooling the belting, after it has been vulcanized, in the manner described, using for the purpose the following apparatus: First, an iron cylinder, about twenty feet in length by four feet in diameter, having in each end or head a horizontal opening thirty-four inches wide by four inches in height, and above and below these openings steam-tubes or pipes running lengthwise through the cylinder, much as in the ordinary tubular boiler. Second, a bench of the same length as the cylinder, placed nearly contiguous thereto and on a level with the opening therein. Third, two sets of clamps, firmly fixed on a level with the bench at an interval from each other of about forty feet, within which stand the cylinder and bench. Taking the coil or coils of belting (for as many belts of the same thickness as can lie side by side within the openings in the cylinder may be treated at the same time) as they come from the cylinder in which they were vulcanized I pass about twenty feet of each piece of belting through the first set of clamps and through the openings in the cylinder, previously heated by steam transmitted from a steam-boiler into the said tubes or pipes. The openings in the cylinder-ends I then close with bags of sand or by other convenient means, leaving the inclosed section of the belting exposed to the heat for from five to twenty minutes, which softens it and renders it more flexible. This done, I remove the sand-bags and slide the belting along the bench to the second set of clamps. Both sets of clamps I then close firmly upon the belting, which, by means of a screw attached to one set, I stretch to the extent of about a half inch to the foot. During the time occupied in heating one section of belting the other section previously heated becomes cool upon the bench. This operation I repeat until the entire belting has passed through the apparatus, heating and cooling two successive lengths simultaneously.

By thus heating, stretching, and cooling the belting it will not stretch after being put to use, and the necessity of its being frequently taken up and shortened, as heretofore, is avoided.

I do not confine myself to the use of the apparatus above referred to, as any other which will effect the desired end may be employed if preferred.

What I claim as my invention, and desire to secure by Letters Patent, is—

The within-described process of successively heating, stretching, and cooling rubber belting after it has been vulcanized, substantially as and for the purpose set forth.

Witness my hand this 6th day of November, 1871.

Witnesses: CHARLES McBURNEY.
P. E. TESCHEMACHER,
W. J. CAMBRIDGE.

(84)